United States Patent
Thapliyal

(10) Patent No.: US 9,569,428 B2
(45) Date of Patent: Feb. 14, 2017

(54) PROVIDING AN ELECTRONIC SUMMARY OF SOURCE CONTENT

(71) Applicant: Citrix Systems, Inc., Fort Lauderdale, FL (US)

(72) Inventor: Ashish V. Thapliyal, Santa Barbara, CA (US)

(73) Assignee: GetGo, Inc., Fort Lauderdale, FL (US)

( * ) Notice: Subject to any disclaimer, the term of this patent is extended or adjusted under 35 U.S.C. 154(b) by 96 days.

(21) Appl. No.: 14/015,100

(22) Filed: Aug. 30, 2013

(65) Prior Publication Data
US 2015/0066501 A1    Mar. 5, 2015

(51) Int. Cl.
*H04N 21/8549* (2011.01)
*G06F 17/28* (2006.01)
*G06F 17/30* (2006.01)

(52) U.S. Cl.
CPC ..... *G06F 17/2836* (2013.01); *G06F 17/30253* (2013.01); *G06F 17/30256* (2013.01); *G06F 17/30616* (2013.01)

(58) Field of Classification Search
CPC .... G06F 17/24; G06F 17/211; G06F 17/2836; G06F 17/30253
See application file for complete search history.

(56) References Cited

U.S. PATENT DOCUMENTS

| | | | | |
|---|---|---|---|---|
| 4,998,285 A * | 3/1991 | Suzuki et al. | | 382/171 |
| 5,402,504 A * | 3/1995 | Bloomberg | G06K 9/6835 | 382/175 |
| 6,256,408 B1 * | 7/2001 | Casey | G06K 9/42 | 382/170 |
| 6,665,661 B1 * | 12/2003 | Crow | G06F 17/30616 | |
| 2003/0042319 A1 * | 3/2003 | Moore | G06F 17/30696 | 235/494 |

(Continued)

OTHER PUBLICATIONS

Liwei He, Elizabeth Sanocki, Anoop Gupta, and Jonathan Grudin. 1999. Auto-summarization of audio-video presentations. In Proceedings of the seventh ACM international conference on Multimedia (Part 1) (Multimedia '99). ACM, New York, NY, USA, 489-498. DOI=10.1145/319463.319691 http://doi.acm.org/10.1145/319463.319691.*

(Continued)

*Primary Examiner* — Matt Ell
*Assistant Examiner* — Mohamed Abou El Seoud
(74) *Attorney, Agent, or Firm* — BainwoodHuang

(57) ABSTRACT

A technique provides an electronic summary of source content. The technique involves performing, on the source content, a content recognition operation to electronically generate text output from the source content. The technique further involves electronically evaluating text portions of the text output based on predefined usability criteria to produce a respective set of usability properties for each text portion of the text output. The technique further involves providing, as the electronic summary of the source content, summarization output which summarizes the source content. The summarization output includes a particular text portion of the text output which is selected from the text portions of the text output based on the respective set of usability properties for each text portion of the text output.

24 Claims, 6 Drawing Sheets

(56) References Cited

U.S. PATENT DOCUMENTS

| | | | |
|---|---|---|---|
| 2006/0067578 A1* | 3/2006 | Fuse | G09B 5/067 382/190 |
| 2006/0245616 A1* | 11/2006 | Denoue | G06K 9/00711 382/100 |
| 2010/0287162 A1* | 11/2010 | Shirwadkar | G06F 17/2785 707/740 |
| 2012/0106925 A1* | 5/2012 | Dirik | H04N 5/147 386/240 |
| 2013/0227401 A1 | 8/2013 | Kandekar et al. | |

OTHER PUBLICATIONS

Liwei He, Elizabeth Sanocki, Anoop Gupta, and Jonathan Grudin. 1999. Auto-summarization of audio-video presentations. In Proceedings of the seventh ACM international conference on Multimedia (Part 1) (Multimedia '99). ACM, New York, NY, USA, 489-498. DOI=10.1145/319463.319691http://doi.acm.org/10.1145/319463.319691.*

International Search Report and Written Opinion of the International Searching Authority, International Application No. PCT/US2014/047983, International Filing Date Jul. 24, 2014, Applicant Citrix Systems, Inc., 9 Pages.

Jiqiang Song, et al., "PVCAIS: A Personal Videoconference Archive Indexing System", Proceedings of the 2003 International Conference of Multimedia and Expo: Jul. 6-9, 2003, Baltimore Marriott Waterfront Hotel, Baltimore, Maryland, USA, IEEE Operations Center, US, vol. 2, pp. 673-676.

* cited by examiner

PROVIDING AN ELECTRONIC SUMMARY OF SOURCE CONTENT

BACKGROUND

Conventional optical character recognition (OCR) typically involves computerized conversion of written information into computerized text. For example, typewritten or handwritten information from a physical piece of paper can be scanned into an electronic image, and then that electronic image can be further processed using pattern recognition algorithms (e.g., on a pixel-by-pixel basis, via feature detection, etc.) to recognize characters and words from the electronic image.

Similarly, conventional speech recognition typically involves computerized conversion of voice input into computerized text, also referred to as speech-to-text conversion. In particular, audio data from a human speaker, or from a recording of the human speaker, can be processed using speech recognition algorithms to electronically transcribe the audio data into computerized text.

SUMMARY

Unfortunately, there are deficiencies to traditional computerized recognition approaches. For example, the above-described conventional OCR approach extracts text from an image, but does not provide any size or location metadata regarding the text. Likewise, above-described conventional speech recognition approach extracts text from audio data, but does not provide any volume or background noise level metadata regarding the text.

Even if such metadata is created and utilized internally in the computerized recognition process, this extra metadata is not exposed externally to others, and no one else seems to use this metadata. However, without such extra metadata, the usefulness of the text is limited. Along these lines, the entire extracted text is often simply stored in raw form (e.g., in a document) for later manual review.

In contrast to the above-described conventional computerized recognition approaches, improved techniques are directed to providing electronic summaries of source content (e.g., summarizes of slide show presentations, audio feeds, etc.) by producing metadata (e.g., text size and location within an image, voice and background noise volume levels, etc.) from recognized source content and using that metadata to select certain text to summarize that source content. Such summarization can be used, among other things, to automatically label content shared during online meetings. For example, the selected text can be applied as one or more tags to the source content to enable effective indexing and searching of the source content among other source content. As another example, the selected text can be saved in a list or other type of reference document to enable users to quickly access a summarization of the source content without having to access and search the entire actual content which may be very large and cumbersome. Accordingly, source content can be easily and effectively summarized without having to do much natural language processing or heavily rely on a semantic understanding of that content.

One embodiment is directed to a method of providing an electronic summary of source content. The method includes performing, on the source content, a content recognition operation to electronically generate text output from the source content. The method further includes electronically evaluating text portions of the text output based on predefined usability criteria to produce a respective set of usability properties for each text portion of the text output. The method further includes providing, as the electronic summary of the source content, summarization output which summarizes the source content (e.g., an electronic summary including one or more labels, titles, subtitles, etc.). This summarization output includes particular text of the text output which is selected from the text portions of the text output based on the respective set of usability properties for each text portion of the text output.

In some arrangements, the source content includes online meeting content shared by a set of participants of an online meeting. In these arrangements, performing the content recognition operation to electronically generate text output from the source content includes generating, as the text output, multiple text portions from the online meeting content shared by the set of participants of the online meeting (e.g., text from slide shows, text from screenshots, text from audio input, and so on).

In some arrangements, the online meeting content includes a screenshot viewed by the set of participants of the online meeting. Here, electronically evaluating text portions of the text output can include identifying, as a set of usability properties of each text portion of the text output, text size, screen location, text color, text style (e.g., bold, italics, etc.), text case (e.g., upper case vs. lower case), relevance based on whether the text resides in a relevance database or whether the text includes delimiters (e.g., bullets, a copyright symbol, etc.), combinations thereof, and so on.

Furthermore, in some arrangements, providing the summarization output which summarizes the source content includes distinguishing different types of summarization output. For example, the source content can be classified as a title, a subtitle, a subscript text section, a normal text section, and so on. Also, the text from one or more of these classes can be applied to the source content as a tag (or label) for subsequent indexing and searching.

In some arrangements, the source content includes multiple screenshots (e.g., a series of images) from a slideshow or a presentation. Here, a summary of the entire slideshow can be easily derived by selecting among certain text portions extracted and highlighted from the source content. The summary can be ultimately selected based on one or more factors such as screenshot order, the viewing time of each screenshot, and so on.

In some arrangements, the online meeting content includes audio input provided by the set of participants of the online meeting. In these arrangements, generating the multiple text portions from the online meeting content can include electronically transcribing the audio input into a text-based transcript of the online meeting. Additionally, electronically evaluating text portions of the text output can include identifying, as a usability property of each text portion of the text output, a sound (or volume) level of that text portion.

Other embodiments are directed to electronic systems and apparatus, processing circuits, computer program products, and so on. Some embodiments are directed to various methods, electronic components and circuitry which are involved in providing an electronic summary of source content.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to providing an electronic summary of source content (e.g., an electronic summary of a slide show presentation, an audio feed, etc.) by producing metadata (e.g., text size, text location within an image, voice and/or background volume levels, etc.) from pattern-recognized source content and using that metadata to select certain text to summarize that source content. Such electronic summaries can be used to label online meeting data such as screenshots, slides, a series of images or video, an audio feed, etc. For example, the selected text can be applied as one or more tags (or labels) to the source content to enable effective indexing and searching of the source content among other source content. Additionally, the selected text can be saved in a list or other type of reference document to enable users to quickly access an electronic summary of the source content without having to access the actual content which may be very large and cumbersome, and so on. As a result, source content can be easily and effectively summarized without having to do much natural language processing or heavily rely on a semantic understanding of that content.

Figure 1:
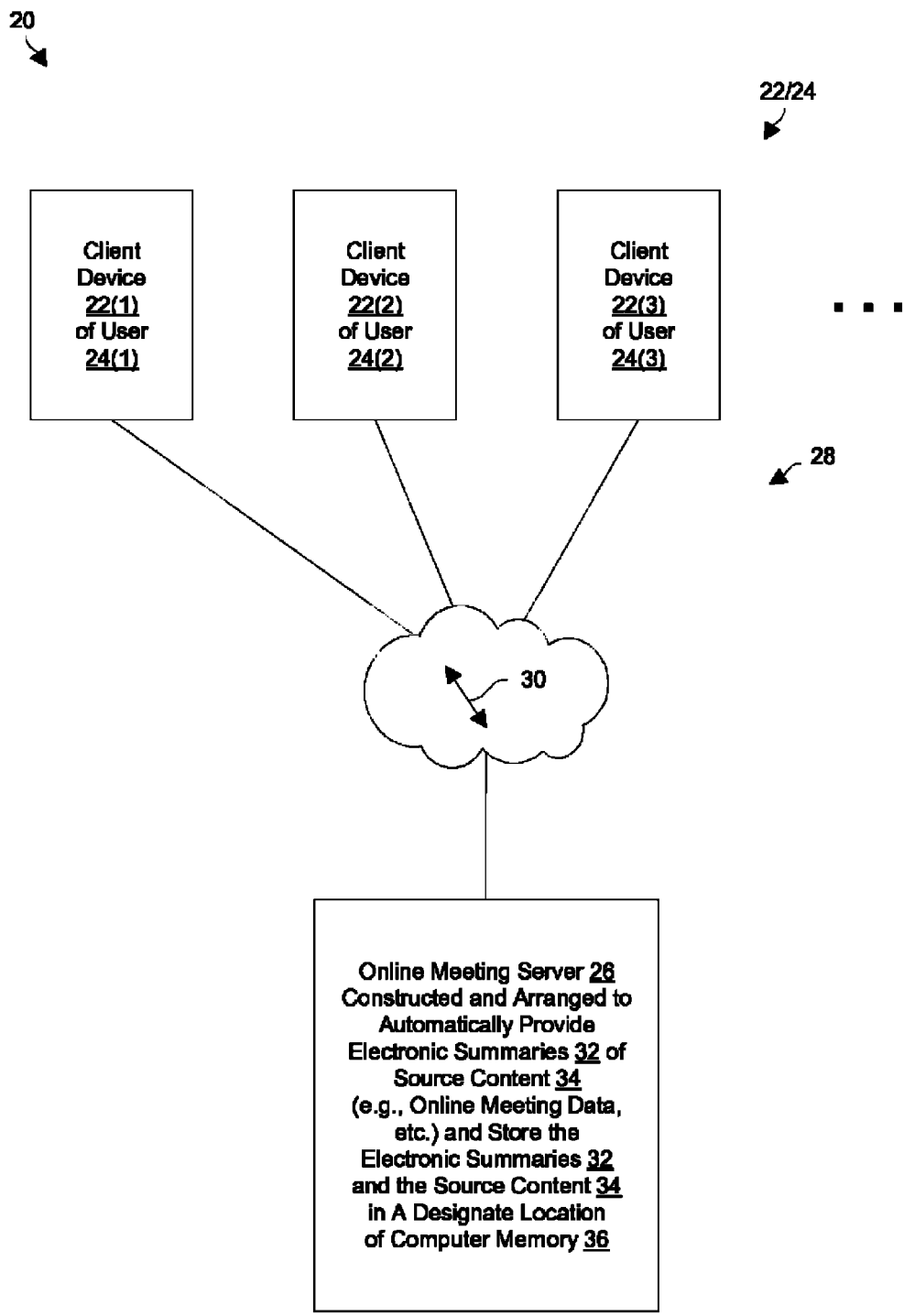
FIG. 1 is a block diagram of an electronic environment which is suitable for providing an electronic summary of source content.

FIG. 1 shows an electronic environment 20 which is suitable for providing an electronic summary of source content. By way of example only, the electronic environment 20 provides the ability for users to share content in the context of online meetings. Accordingly, online meeting participants are able to watch visual content (e.g., a series of images, slides or screenshots), as well as ask questions and inject comments to form a collaborative exchange even though the conference participants may be scattered among remote locations. Moreover, such online meeting content may be automatically evaluated and processed to provide electronic summaries of the online meetings for subsequent sorting and searching.

Along these lines, the electronic environment 20 includes client devices 22(1), 22(2), 22(3), . . . (collectively, client devices 22) operated by respective users 24(1), 24(2), 24(3), . . . (collectively, users 24), an online meeting server 26, and communications medium 28. In the context of online meetings, such users 24 may be participants who wish to review material from online meetings or users 24 who did not participate in the online meetings but wish to quickly find and access electronic summaries and/or recordings of the online meetings. An online meeting system which provides recordings of online meetings is disclosed in U.S. application Ser. No. 12/978,214, entitled "SYSTEMS, METHODS, AND DEVICES FOR GENERATING A SUMMARY DOCUMENT OF AN ONLINE MEETING," the teachings of which are hereby incorporated in their entirety.

Each client device 22 is constructed and arranged to operate, among other things, as an online meeting client (e.g., watch a presentation, participate in an online discussion, etc.), as well as perform other useful work, on behalf of a respective user 24. For example, the client device 22(1) enables a user 24(1) to participate in online meetings. Similarly, the client device 22(2) enables a user 24(2) to participate in online meetings, and so on. Examples of additional useful work include enabling respective users 24 to access the Internet via a browser application, operating as a word processor, allowing users 24 to read and send email and/or text messages, and so on. It should be understood that a variety of apparatus are suitable for use as the client devices 22 such as general purpose computers, user workstations, laptop computers, tablets, smart phones, voice over IP (VoIP) phones, standard telephones, combinations thereof, etc.

The online meeting server 26 is constructed and arranged to host online meetings among the users 24, as well as automatically summarize, collect and store online meeting data from online meetings (e.g., a series of screenshots and/or voice input as source content). Additionally, the online meeting data may be stored in an online workspace for future access (e.g., searching, sorting, navigating, etc.) by one or more users 24. Moreover, it should be understood that the online meeting may take a variety of online collaboration approaches such as audio only, video only, a combination of audio and video, point-to-point, online conferencing, online webinars, online training, online technical assistance, online file sharing, online workspace sharing, online project management, online workflows, combinations thereof, and so on.

The communications medium 28 is constructed and arranged to connect the various components of the electronic environment 20 together to enable these components to exchange electronic signals 30 (e.g., see the double arrow 30). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, cellular communications, standard telephone communications, combinations thereof, etc.

During operation, each client device 22 is capable of connecting to an online meeting which shares online meeting content among the users 24. For example, the user 24(1) initially may be a presenter and run a slideshow program, and the other users 24(2), 24(3), . . . may participate as attendees to watch the slide show. Furthermore, at some point during the online meeting, one of the other users 24(2), 24(3), . . . may take over as the presenter and run the same slideshow program or perhaps a different program such as a word processor application, a browser, and so on. As a result, the online meeting participants are able to share visual content, as well as ask questions and inject comments to form a collaborative exchange even though the participants may be distributed across various remote locations.

Moreover, while each participating client device 22 operates to involve a respective user 24 in the online meeting, the online meeting server 26 performs a set of operations to automatically generate electronic summaries 32 and to automatically collect online meeting data 34 from the client devices 22. As will be explained in further detail shortly, such electronic summaries 32 enable efficient and effective organization and searching of the online meeting data 34.

The online meeting server 26 then stores the electronic summaries 32 along with the collected online meeting data 34 in a designated location of computer memory 36, e.g., memory on the online meeting server 26, in the cloud, etc. Accordingly, based on the electronic summaries 32, the users 24 are able to later access the collected online meeting data 34 once the online meeting is over, e.g., to review material in closer detail, to study material if the user 24 missed the online meeting, etc.

In some arrangements, at least some of the summarization and/or collection of the online meeting data 34 is performed by one or more of the client devices 22. Such operation offloads at least some of this work from the online meeting server 26. In these arrangements, the electronic summaries 32 and/or online meeting data 34 may be stored on a particular client device 22 and/or sent to another computerized storage location (i.e., computer memory 44) such as the online meeting server 26 or separate cloud storage at a later time for subsequent access by other users 24.

Additionally, in some arrangements, the online meeting server 26 (or a separate external device) locally runs a specialized application to provide an electronic summary 32 of online meeting data 34 as well as collect the online meeting data 34. As mentioned earlier, such online meeting data 34 may include a combination of visual and audio data exchanged during the online meeting. Further details will now be provided with reference to FIG. 2.

Figure 2:
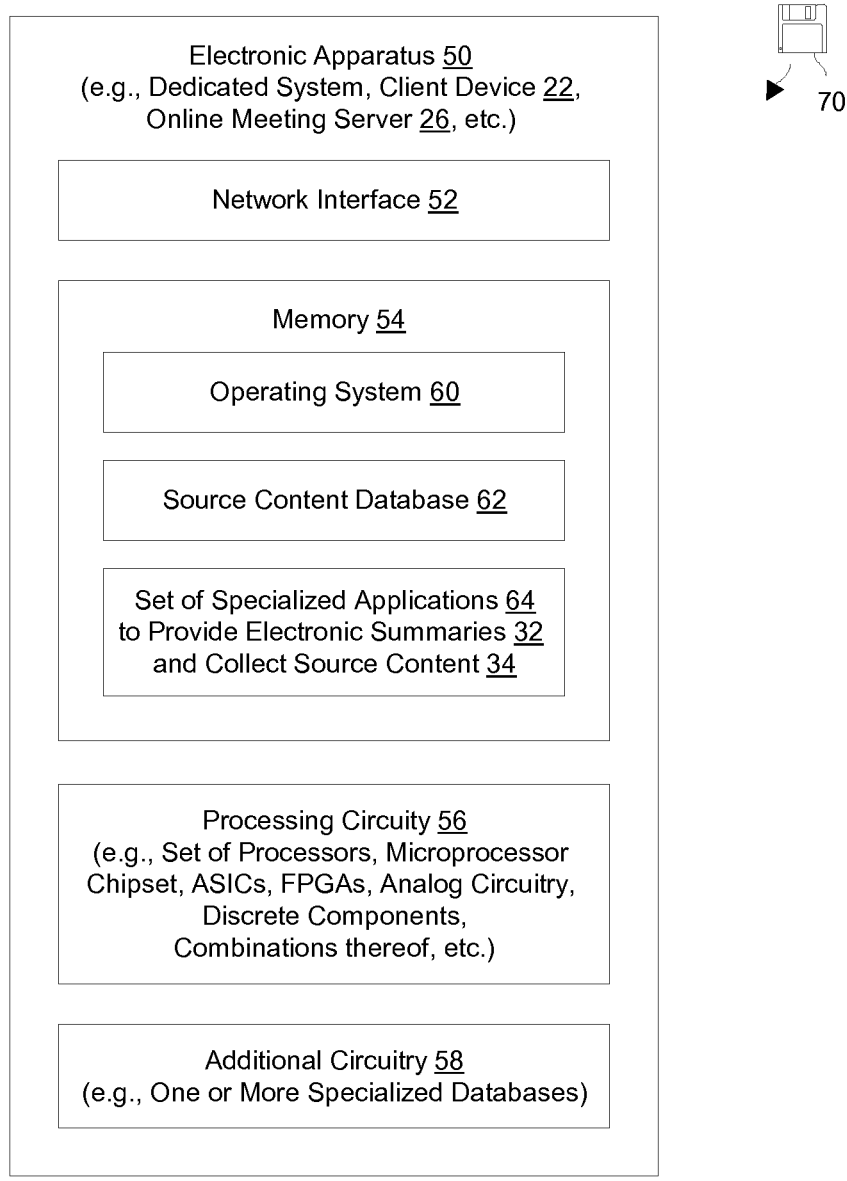
FIG. 2 is a block diagram of an electronic apparatus of the electronic environment of FIG. 1.

FIG. 2 is a block diagram of an electronic apparatus 50 of the electronic environment 20 of FIG. 1. The electronic apparatus 50 is suitable for use as a client device 22, the online meeting server 26, and/or a dedicated system. In any of these situations, the electronic apparatus 50 automatically provides electronic summaries 32, as well as collects and stores online meeting data 34 for future access by the users 24. As shown in FIG. 2, the electronic apparatus 50 includes a network interface 52, memory 54, processing circuitry 56, and additional circuitry 58.

The network interface 52 is constructed and arranged to connect the electronic apparatus 50 to the communications medium 28 (also see FIG. 1). Accordingly, the network interface 52 enables the electronic apparatus 50 to communicate with the other components of the electronic environment 20. Such communications may be copper-based, optical-based or wireless (i.e., IP-based, POTS-based, SAN-based, cellular, Bluetooth, combinations thereof, and so on).

The memory 54 is intended to represent both volatile storage (e.g., DRAM, SRAM, etc.) and non-volatile storage (e.g., flash memory, magnetic disk drives, etc.). The memory 54 stores a variety of software constructs including an operating system 60, a source content database 62, and a set of specialized applications 64 to provide electronic summaries 32 as well as collect and store online meeting data 34 in the source content database 62.

The processing circuitry 56 is constructed and arranged to operate in accordance with the various software constructs stored in the memory 54. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 70 is capable of delivering all or portions of the software to the electronic apparatus 50. The computer program product 70 has a non-transitory (or non-volatile) computer readable medium which stores a set of instructions which controls one or more operations of the electronic apparatus 50. Examples of suitable computer readable storage media include tangible articles of manufacture and apparatus which store instructions in a non-volatile manner such as CD-ROM, flash memory, disk memory, tape memory, and the like.

The additional circuitry 58 is dependent on whether the electronic apparatus 50 is a client device 22, the online meeting server 26, or a dedicated external system. For example, if the electronic apparatus 50 is a user's workstation, the additional circuitry 58 may include user interface hardware such as a standard keyboard, a pointing device (e.g., mouse), a headset (e.g., microphone and speakers) and a display. Similarly, if the electronic apparatus 50 is a user's smart phone or tablet device, the additional circuitry 58 may include a touch screen, a camera, phone hardware, and so on.

Alternatively, if the electronic apparatus 50 is the online meeting server 26 or a dedicated external system, the additional circuitry 58 may include other types of specialized hardware. For example, if the electronic apparatus 50 operates as a central location from which to share online meeting data 34 from multiple online meetings among the users 24, the electronic apparatus 50 may include web server circuitry to serve web pages to the users 24. Such additional circuitry 58 enables the users 24 to navigate among multiple web pages based on the electronic summaries 32 to search, rank, sort, select, etc. online meeting data 34 collected from the various online meetings (see the source content database 62 in FIG. 2).

In some arrangements, the additional circuitry 58 includes one or more specialized relevancy databases. Each relevancy database includes keywords and/or phrases. For example, one specialized database includes words, delimiters and/or symbols which, if found in text extracted from the source content, indicate that the text may make a relevant summary. As another example, another specialized database includes words, delimiters and/or symbols which, if found in text extracted from the source content, indicate that the text would not be suitable as a relevant summary. Further details will now be provided with reference to FIG. 3.

Figure 3:
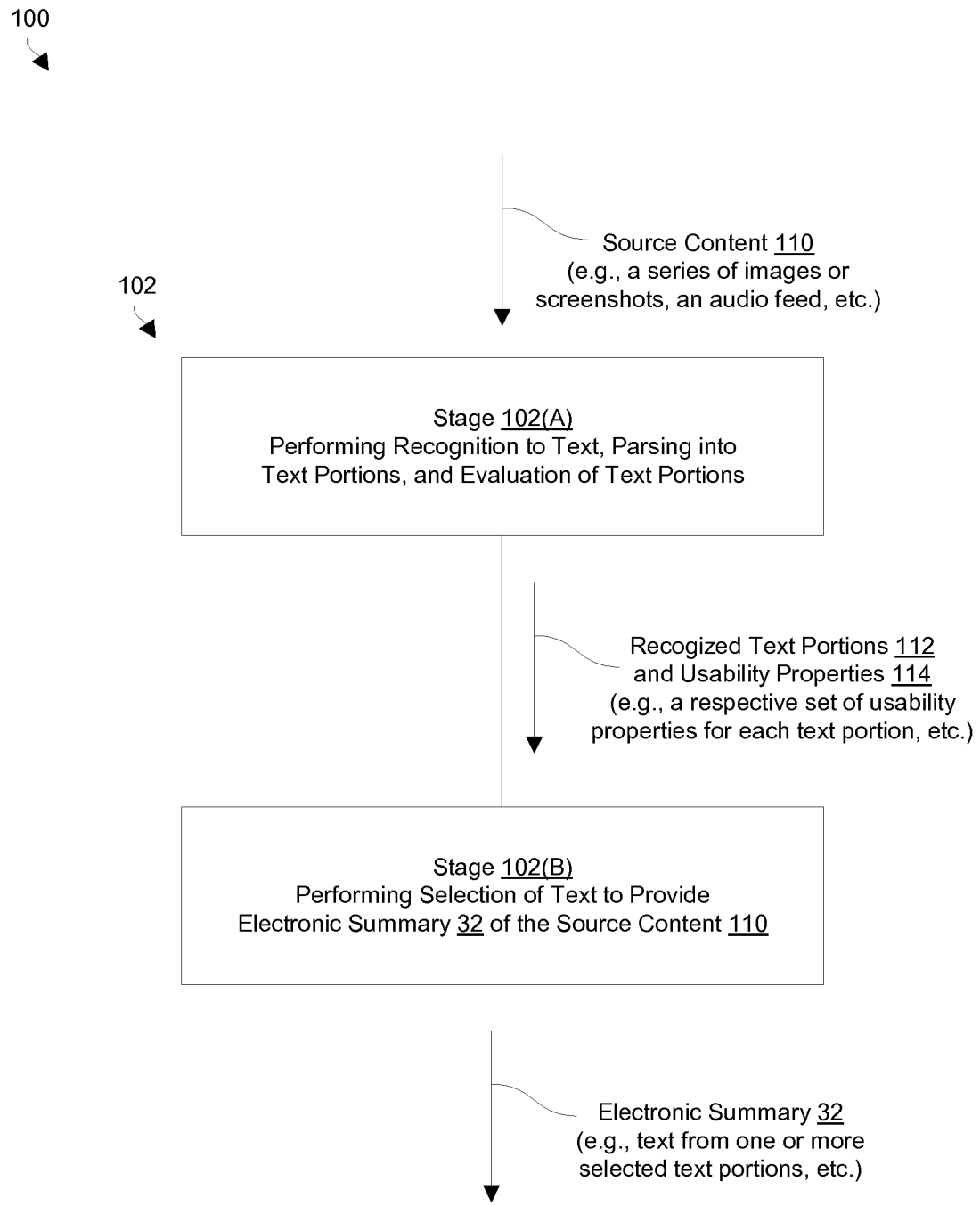
FIG. 3 is a block diagram of a set of stages which is suitable for providing an electronic summary of source content.

FIG. 3 shows an arrangement 100 of stages 102 which is suitable for providing an electronic summary 32 of source content. The stages 102 are coupled together to enable output from one stage 102 to be used as input by another stage 102. In particular, the stage 102(A) is constructed and arranged to recognize text from source content 110, parse the recognized text into text portions 112, and provide an evaluation of the text portions 112, i.e., usability properties 114. Based on the recognized text portions 112 and the usability properties 114 from the stage 102(A), the stage 102(B) is constructed and arranged to select text from the text portions 112 and provide an electronic summary 32 of the source content 110. It should be understood that such stages 102 can be formed by the processing circuitry 56 executing the set of specialized applications 64 (also see FIG. 2).

In some arrangements, the source content 110 includes visual data such as a series of images, screenshots or slides. In these arrangements, the stage 102(A) performs OCR-style operations to recognize text from the visual data. If the video is moving, the stage 102(A) may capture screenshots of the moving video and process them as still images. The stage 102(A) then parses the text into text portions 112 based on usability criteria, e.g., based on whitespace, line changes, punctuation (e.g., commas, semicolons, etc.), changes in style (italics, bold, etc.), changes in font size, changes in font type, changes in font color, and so on, and derives usability properties 114 for the text portions.

These usability properties 114 are considered metadata which defines the usability (i.e., a measure of usefulness) of the text portions 112 as a suitable summary of the source content 110. That is, the usability properties 110 identify certain summary suitability aspects (or heuristics) of the text portions 112 (e.g., text size, text location, text color, text style, whether the text is capitalized, whether the text resides in a special dictionary or list, whether the text is delimited, the amount of time that the text is displayed, and so on). For example, the stage 102(A) can provide a first set of usability properties 114 for text located in the upper half of a first slide, and a second set of usability properties 114 for text located in the lower half of the first slide. Similarly, the stage 102(A) can provide other sets of usability properties 114 for text located in other slides, and so on.

In some arrangements, the source content 110 includes audio data such as a live audio feed or an audio recording. In these arrangements, the stage 102(A) performs speech-to-text-style operations to recognize text from the audio data. The stage 102(A) then parses the text into text portions 112 based on usability criteria such as pauses, voice volume level, and so on. Additionally, in a manner similar to that described above for visual data as the source content 110, the usability properties 114 are considered metadata for the audio data by defining the usability of the text portions 112 as a suitable summary of the audio data source content 110. Along these lines, the usability properties 110 identify certain summary suitability aspects of the text portions 112 such as voice volume level, speaking time, the number of individual audio inputs, whether background noise is present in any of the audio inputs, and so on.

With the recognized text portions 112 and the usability properties 114 now available, the stage 102(B) automatically chooses text from one or more of the text portions 112 based on the usability properties 114. Along these lines, the stage 102(B) is capable of applying a variety of techniques to classify certain text as a tag or label, a keyword, a title, a subtitle, and so on.

The chosen text is then considered the electronic summary 32 of the source content 110. As a result, the summary 32 can be used as a high level description of the source content 110, as a tag or index to locate the source content 110 if stored in a similar manner with other source content 110, and so on.

EXAMPLE

Figure 4:
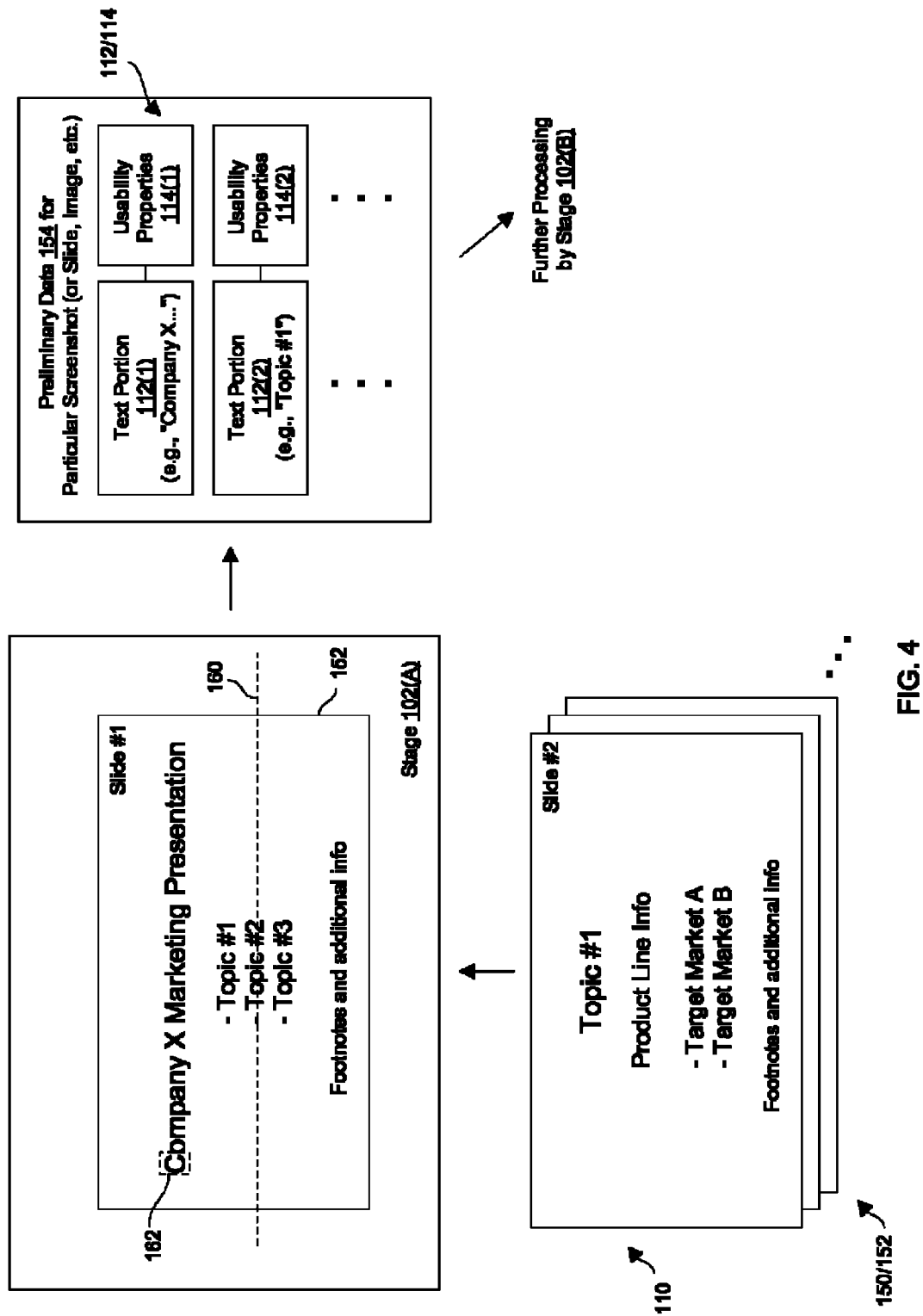
FIG. 4 is a block diagram of an example illustrating the operation of a particular stage of FIG. 3.
Figure 5:
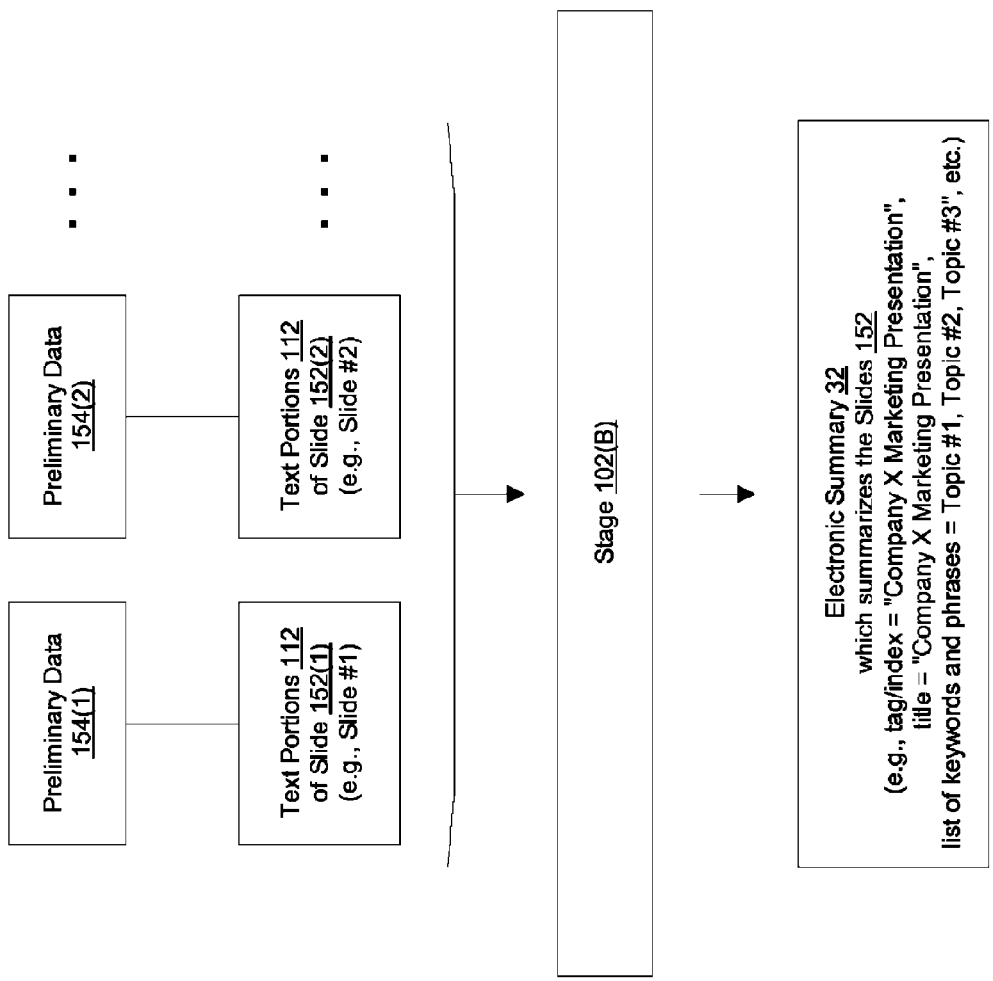
FIG. 5 is a block diagram of the example illustrating the operation of another stage of FIG. 3.

FIGS. 4 and 5 show an example of the arrangement 100 of stages 102 in operation (also see FIG. 3). FIG. 4 shows certain details of how the stage 102(A) initially processes the source content 110 to provide text portions 112 and usability properties 114. FIG. 5 shows certain details of how the stage 102(B) generates an electronic summary 32 based on the text portions 112 and the usability properties 114 from the stage 102(A).

In the example of FIGS. 4 and 5, the source content 110 includes a slide show 150 (i.e., a series of slides) presented to a group of users 24 during an online meeting. In other situations, the source content 110 may be different visual content such as an image or picture, a series of pictures or screenshots, a video, an audio feed, combinations thereof, and so on.

As shown in FIG. 4, each slide 152 of the slide show 150 includes visual content which is capable of being recognized. For example, slide #1 (shown in FIG. 4 as being currently input into the stage 102(A)) presents a title, subtitles, and a footnote and additional information. Similarly, slide #2 presents a title, subtitles, and so on. Such visual content is essentially bitmap data which the stage 102(A) recognizes into recognized text. The stage 102(A) then parses recognized text into text portions 112 and generates, as the usability properties 114, particular summary suitability aspects (or heuristics) regarding the text portions 112.

In terms of text size of a particular text portion 112, the usability properties 114 for that text portion 112 can indicate a numerical font size (or point size, or pitch, etc.) which indicates how large the text is within the image.

In terms of text location of a particular text portion 112, the usability properties 114 for that text portion 112 can indicate a numerical vertical score which indicates how high (or low) that text portion sits within the image. Similarly, the usability properties 114 for that text portion 112 can indicate a numerical horizontal score which indicates how far from a side (left or right) that text portion sits within the image. Moreover, whether text satisfies a requirement for using that text as a particular type of summary (e.g., as a tag, as a title, as a keyword, etc.) can be based on whether the particular location for that text properly satisfies certain location threshold requirements via comparison of the particular location to one or more image location thresholds 160 (e.g., see dashed line 160 in FIG. 4). Furthermore, other location criteria are suitable for use depending on various aspects of the particular context (e.g., whether the source is a slide, a document, etc.).

Likewise, the stage 102(A) outputs other parameters identifying text color, text style, whether the text is capitalized, whether the text resides in a special dictionary or list, whether the text is delimited, the amount of time that the text is displayed, and so on. This set of metadata thus results from an assessment of the recognized text against predefined usability criteria, and forms a set of usability properties 114 for the particular text portion 112.

This stream of text portions 112 and corresponding usability properties is then fed by the stage 102(A) as preliminary data 154 to the stage 102(B). In some arrangements, the preliminary data 154 includes a text-height distribution which the stage 102(A) provides for all text portions 112 in each image (or series of images). In some arrangements, the stage 102(A) stores or buffers this preliminary data 154 in memory (see memory 54 in FIG. 2).

It should be understood that, to determine the usability properties 114 for each text portion 112, the stage 102(A) can apply certain OCR-style algorithms to identify text size, text location, text color, text style (i.e., bold, italics, etc.), whether the text is capitalized, whether the text resides in a special dictionary or list, whether the text is delimited, the amount of time that the text is displayed, and so on. The stage 102(A) then outputs a respective set of usability properties 114 for each text portion 112. For example, for a first text portion 112(1) (also see "Company X Marketing Presentation" of slide #1 in FIG. 4), the stage 102(A) provides a first set of usability properties 114(1). Likewise, for a second text portion 112(1) (also see "Topic #1 " of slide

1 in FIG. 4), the stage 102(A) provides another set of usability properties 114(2), and so on.

It should be understood that one suitable way of extracting text size and location is to utilize a standard OCR library. Along these lines, the stage 102(A) scans each slide or image (e.g., left to right, and top to bottom) with a variable-sized selector-box 162 (e.g., see dashed box 162 in FIG. 4). During such scanning, the stage 102(A) increases the height (or size) of the selector-box 160 from smallest to largest size in increments corresponding to standard font sizes. Additionally, the stage 102(A) decrements the width of the selector-box 162 from largest to smallest in small steps. The region of the image inside the selector-box 162 is fed into the OCR library to recognize the text in that region. The location of the selector-box 162 within that slide serves as the location of the text, while the height of the selector-box serves as the size of the text. Once the stage 102(A) has scanned the slide in this manner, the stage 102(A) outputs a list of text-boxes with location and text-height information, i.e., a text-height distribution for all text in the slide 152. Other OCR-style operations are performed by the stage 102(A) to determine color, italics, bold, etc. attributes as well.

Once the stage 102(A) has completed processing of a slide 152 to deliver the preliminary data 154 for that slide 152 to the stage 102(B), the stage 102(A) moves on to process another slide 152 if available (see slide #2 in FIG. 4). Such operation continues until all of the source content 110 has been processed by the stage 102(A).

As shown in FIG. 5, the stage 102(B) receives the text portions 112 of the slides 152 and the corresponding preliminary data 154, and selects text from the text portions for use as an electronic summary 32 of the slides 152. For example, the stage 102(B) receives the text portions 112 of the slide 152(1) and the corresponding preliminary data 154(1) containing usability properties 114 corresponding to the text portions 112 of slide 152(1). Likewise, the stage 102(B) receives the text portions 112 of the slide 152(2) and the corresponding preliminary data 154(2) containing usability properties 114 corresponding to the text portions 112 of slide 152(2), and so on.

The stage 102(B) then makes inferences based on the corresponding metadata, i.e., based on the usability properties 114 corresponding to the text portions 112 of the various slides 152. As a result, the stage 102(B) effectively generates accurate summarization material, i.e., an electronic summary 32, appropriate for the source content 110 (see FIGS. 3 through 5).

Suitable Techniques for Selecting Summarization Material

A set of suitable techniques for selecting summarization material as the electronic summary 32 will now be described. In particular, the summarization material is selected based on an assessment of certain usability properties 114 (i.e., measures of usefulness) corresponding to respective text portions 112. Such summarization material can be included as tags or keywords for indexing the source content 110, quick searching and/or quick reviewing the source content 110, sorting the source content 110, and so on (also see the source content database 62 in FIG. 2).

A title for source content 110 can be selected from contiguous text located in the topmost region of an image provided that the text exceeds a certain font size (e.g., see use of thresholds 160 and text-boxes 162 in FIG. 4). Other metadata attributes can be included as factors such as which slide text is from (e.g., preferably the first slide, preferably the last slide, etc.), the relative font sizes of other text (e.g., the size of adjacent text, the size of text in the bottommost region, etc.).

A subtitle for source content 110 can be selected from a text-size distribution for all text in a particular image, or series of images. For example, all text larger than a predefined threshold over the median text size can be treated as subtitle text. As another example, text for subtitles can be selected based on notions of centrality such as mean and mode. As yet another example, text for subtitles can be selected based on notions of dispersion such as standard deviation, variance, interquartile range, etc. Other techniques are suitable for use as well, e.g., further techniques, combinations of the above-mentioned techniques, slight modifications to the above-described techniques, etc.

Subscript text of source content 110 can be extracted based on a text-height distribution for all text in a particular image, or series of images. For example, all text smaller than a predefined threshold under the median text size can be treated as subscript text. Again, alternatives techniques can be based on notions of centrality, dispersion, combinations thereof, and so on.

Normal text of the source content 110 can be extracted based on a text-height distribution for all text in a particular image, or series of images. For example, all text within a predefined threshold of the median text size can be treated as normal text. Also, alternatives techniques can be based on notions of centrality, dispersion, combinations thereof, and so on.

It should be understood that other metadata and usability criteria can be included as factors for identifying particular types of summarization material. Along these lines, such factors can include text color, text type (e.g., italics, bold, underscore, etc.), whether the text is capitalized, whether the text resides in a special dictionary or list, whether the text is delimited, the amount of time that the text is displayed, and so on, to detect important text in a particular image or series of images.

For example, the additional circuitry 58 of the electronic apparatus 50 (FIG. 2) may be equipped with a specialized dictionary of keywords or phrases that, if determined to be present in a particular text portion 112, indicate that the particular text is well suited for use as the electronic summary 32 (e.g., well suited as a title, as a subtitle, etc.). Additionally, the additional circuitry 58 of the electronic apparatus 50 (FIG. 2) may be equipped with a specialized dictionary of keywords or phrases that, if present in a particular text portion 112, indicate that the particular text is not well suited for use as the electronic summary 32.

Furthermore, the additional circuitry 58 of the electronic apparatus 50 (FIG. 2) may be equipped with a specialized database or list of delimiters and/or symbols that, if present in a particular text portion 112, indicate whether that the particular text is well suited for use as the electronic summary 32. For example, in some arrangements, a short phrase in within quotes is considered well suited as a title or subtitle. As another example, in some arrangements, a short phrase following the copyright symbol "©" is considered not well suited as a title or subtitle, and so on.

Moreover, if the source content 110 includes a series of different images, screenshots or slides, additional factors (see the usability properties 114 in FIGS. 3 through 5) can be considered in selecting text to summary the source content 110. For example, titles of earlier slides (e.g., slide #1) can be considered better titles for summarizing entire source content 110 than those of later slides. As another example, titles of slides that remain in view longer can be considered better titles for summarizing entire source content 110 than those of slides that do not remain displayed very long, and so on.

For an audio feed, the usability properties 110 identifies certain aspects of the audio feed (e.g., voice volume or loudness levels, a degree of background noise, the amount of time that the talker is talking, whether certain words reside in a specialized database, and so on). Again, it should be understood that the text portions 112 can be parsed or separated based on pause times, changes in speakers, etc.

In some arrangements, the electronic apparatus 50 considers text extracted from different sources for use as the electronic summary 32. For example, the electronic apparatus 50 can consider text from a slide show of an online meeting, an audio feed of the online meeting, or both when selecting text to use as an electronic summary 32 of the online meeting.

Further Details

Figure 6:
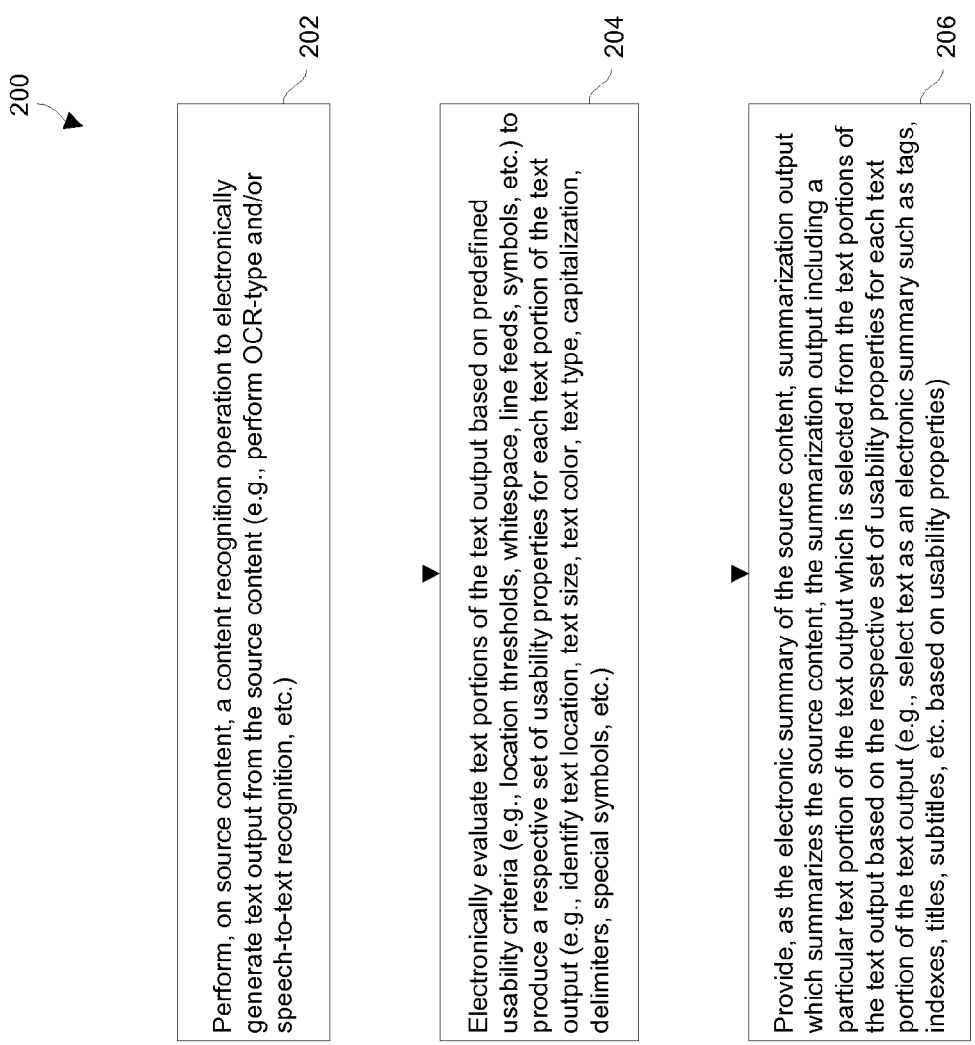
FIG. 6 is a flowchart of a procedure which is performed by an electronic apparatus when providing an electronic summary of source content.

FIG. 6 is a flowchart of a procedure 200 which is performed by the electronic apparatus 50 when providing an electronic summary 32 of source content 110 (also see FIG. 2). In step 202, the electronic apparatus 50 performs, on the source content 110, a content recognition operation to electronically generate text output from the source content 110. For visual data, the content recognition operation can involve OCR-type operations performed individually on images of the visual data. For audio data, the content recognition operation can involve speech-to-text type operations performed individually on the audio data. For source content having both visual data and audio data, the content recognition operation can involve OCR-type operations performed individually on images of the visual data, speech-to-text type operations performed individually on the audio data, or both.

In step 204, the electronic apparatus 50 electronically evaluates text portions 112 of the text output based on predefined usability criteria to produce a respective set of usability properties 114 for each text portion 112 of the text output. In particular, the electronic apparatus 50 parses the text output based on whitespace, location, pauses, etc., and identifies usability properties 114 which indicate a level of usefulness of the parsed text as suitable summary material. Such usability properties 114 include attributes of the text portions 112 such as text location, text size, text color, and so on.

In step 206, the electronic apparatus 50 provides, as the electronic summary 32 of the source content 110, summarization output which summarizes the source content 110. The summarization output (see electronic summary 32 in FIG. 3) includes a particular text portion 112 of the text output which is selected from the text portions 112 of the text output based on the respective set of usability properties 114 for each text portion 112 of the text output. The electronic summary 32 can include a set of tags, indexes, keywords, titles, subtitles, and so on. Accordingly, users 24 are able to review, sort, search, filter, etc. a variety of source content 110 (e.g., see the source content database 62) to quickly locate and access particular source content 110.

As described above, improved techniques are directed to providing electronic summaries 32 of source content 110 (e.g., summarizes of slide show presentations, audio feeds, etc.) by producing metadata (e.g., text size and location within an image, voice and background noise volume levels, etc.) from recognized source content 110 and using that metadata to select certain text to summarize that source content 110. Such summarization can be used, among other things, to automatically label content shared during online meetings. For example, the selected text can be applied as one or more tags to the source content 110 to enable effective indexing and searching of the source content 110 among other source content 110 (see the source content database 62 in FIG. 2). As another example, the selected text can be saved in a list or other type of reference document to enable users to quickly access a summarization of the source content 110 without having to access and search the actual content which may be very large and cumbersome. Accordingly, source content can be easily and effectively summarized without having to do much natural language processing or heavily rely on a semantic understanding of that content.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the online meeting server 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the source content 110 was described above as originating from an online meeting by way of example only. Other sources for the source content 110 are suitable for use in the electronic environment 20 as well such as movie clips, music, videos, general content, and so on. Such modifications and enhancements are intended to belong to various embodiments of the disclosure.

What is claimed is:

1. A method of providing an electronic summary of source content, the method comprising:
   performing, on the source content, a content recognition operation to electronically generate text output from the source content;
   electronically evaluating text portions of the text output based on predefined usability criteria to produce a respective set of usability properties for each text portion of the text output; and
   providing, as the electronic summary of the source content, summarization output which summarizes the source content, the summarization output including a particular text portion of the text output which is selected from the text portions of the text output based on the respective set of usability properties for each text portion of the text output;
   wherein the source content includes online meeting content shared by a set of participants of an online meeting;
   wherein performing the content recognition operation to electronically generate text output from the source content includes generating, as the text output, multiple text portions from the online meeting content shared by the set of participants of the online meeting;

wherein the online meeting content includes a series of screenshots viewed by the set of participants of the online meeting;

wherein the summarization output includes multiple selected text portions of the text output, each selected text portion corresponding to a different screenshot of the series of screenshots;

wherein the method further comprises choosing a certain selected text portion from the multiple selected text portions of the text output and applying that certain selected text portion as a tag to the source content;

wherein each screenshot of the series of screenshots has a respective order number indicating a location of that screenshot in the series of screenshots;

wherein choosing the certain selected text portion from the multiple selected text portions includes picking the certain selected text portion from the multiple selected text portions based on the respective order number of each screenshot;

wherein the series of screenshots includes a slideshow having slides, each slide having a different slide number corresponding to a location of that slide in the slideshow;

wherein picking the certain selected text portion from the multiple selected text portions includes (i) selecting a particular slide number from multiple selectable slide numbers, and (ii) choosing, as the certain selected text portion, a portion of text from a particular slide having the particular slide number;

wherein choosing the portion of text from the particular slide having the particular slide number includes:
selecting the portion of text from the first slide of the slideshow in response to selecting slide #1 as the particular slide number; and wherein applying the certain selected text portion as the tag to the source content includes:
labeling the source content with the selected portion of text from the first slide of the slideshow, the selected portion of text serving as a topic indicator during subsequent searching of different source content.

2. A method as in claim 1 wherein the online meeting content includes a screenshot viewed by the set of participants of the online meeting; and wherein electronically evaluating the text portions of the text output includes:
identifying, as a usability property of each text portion of the text output, a text size of that text portion.

3. A method as in claim 1 wherein the online meeting content includes a screenshot viewed by the set of participants of the online meeting; and wherein electronically evaluating the text portions of the text output includes:
identifying, as a usability property of each text portion of the text output, a location of that text portion within a context.

4. A method as in claim 1 wherein the online meeting content includes a screenshot viewed by the set of participants of the online meeting; and wherein electronically evaluating the text portions of the text output includes:
identifying, as a usability property of each text portion of the text output, a text color of that text portion.

5. A method as in claim 1 wherein the online meeting content includes a screenshot viewed by the set of participants of the online meeting; and wherein electronically evaluating the text portions of the text output includes:
identifying, as a usability property of each text portion of the text output, a text style of that text portion.

6. A method as in claim 1 wherein the online meeting content includes a screenshot viewed by the set of participants of the online meeting; and wherein electronically evaluating the text portions of the text output includes:
identifying, as a usability property of each text portion of the text output, a text case of that text portion.

7. A method of providing an electronic summary of source content, the method comprising:
performing, on the source content, a content recognition operation to electronically generate text output from the source content;
electronically evaluating text portions of the text output based on predefined usability criteria to produce a respective set of usability properties for each text portion of the text output; and
providing, as the electronic summary of the source content, summarization output which summarizes the source content, the summarization output including a particular text portion of the text output which is selected from the text portions of the text output based on the respective set of usability properties for each text portion of the text output;
wherein the source content includes online meeting content shared by a set of participants of an online meeting;
wherein performing the content recognition operation to electronically generate text output from the source content includes generating, as the text output, multiple text portions from the online meeting content shared by the set of participants of the online meeting;
wherein the online meeting content includes a screenshot viewed by the set of participants of the online meeting; and wherein electronically evaluating the text portions of the text output includes:
identifying, as a usability property of each text portion of the text output, a relevance of that text portion based on whether that text portion resides in a relevance database;
wherein the series of screenshots includes a slideshow having slides, each slide having a different slide number corresponding to a location of that slide in the slideshow;
wherein picking the certain selected text portion from the multiple selected text portions includes (i) selecting a particular slide number from multiple selectable slide numbers, and (ii) choosing, as the certain selected text portion, a portion of text from a particular slide having the particular slide number;
wherein choosing the portion of text from the particular slide having the particular slide number includes:
selecting the portion of text from the first slide of the slideshow in response to selecting slide #1 as the particular slide number; and
wherein the method further comprises applying the selected portion of text as the tag to the source content so that the tag serves as a topic indicator during subsequent searching of different source content.

8. A method as in claim 1 wherein the online meeting content includes a screenshot viewed by the set of participants of the online meeting; and wherein electronically evaluating the text portions of the text output includes:
identifying, as a usability property of each text portion of the text output, a relevance of that text portion based on whether that text portion includes text delimiters.

9. A method as in claim 1 wherein the online meeting content includes a screenshot viewed by the set of participants of the online meeting; and wherein providing the summarization output which summarizes the source content includes:
  identifying, as a title of the screenshot, the particular text portion of the text output based on text location criteria and text height criteria of the predefined usability criteria.

10. A method as in claim 1 wherein the online meeting content includes a screenshot viewed by the set of participants of the online meeting; and wherein providing the summarization output which summarizes the source content includes:
  identifying, as a subtitle of the screenshot, the particular text portion of the text output based on (i) a text-height distribution of the portions of the text output and (ii) a predefined subtitle size threshold.

11. A method as in claim 1 wherein the online meeting content includes a screenshot viewed by the set of participants of the online meeting; and wherein providing the summarization output which summarizes the source content includes:
  identifying, as a subscript text section of the screenshot, the particular text portion of the text output based on (i) a text-height distribution of the portions of the text output and (ii) a predefined subscript size threshold.

12. A method as in claim 1 wherein the online meeting content includes a screenshot viewed by the set of participants of the online meeting; and wherein providing the summarization output which summarizes the source content includes:
  identifying, as a normal text section of the screenshot, the particular text portion of the text output based on (i) a text-height distribution of the portions of the text output and (ii) a set of predefined normal text size thresholds.

13. A method as in claim 1, further comprising:
  storing the source content in a database among other source content, and using the applied tag as an index to enable source content sorting and searching based on tags.

14. A method as in claim 1 wherein each screenshot of the series of screenshots has a respective viewing time during the online meeting; and wherein choosing the certain selected text portion from the multiple selected text portions includes:
  picking the certain selected text portion from the multiple selected text portions based on the respective viewing time of each screenshot.

15. A method as in claim 1 wherein the online meeting content includes audio input provided by the set of participants of the online meeting;
  wherein generating the multiple text portions from the online meeting content includes electronically transcribing the audio input into a transcript of the online meeting; and
  wherein electronically evaluating text portions of the text output includes identifying, as a usability property of each text portion of the text output, a sound level of that text portion.

16. A computer program product having a non-transitory computer readable medium which stores a set of instructions to provide an electronic summary of source content, the set of instructions, when carried out by computerized circuitry, causing the computerized circuitry to perform a method of:
  performing, on the source content, a content recognition operation to electronically generate text output from the source content;
  electronically evaluating text portions of the text output based on predefined usability criteria to produce a respective set of usability properties for each text portion of the text output; and
  providing, as the electronic summary of the source content, summarization output which summarizes the source content, the summarization output including a particular text portion of the text output which is selected from the text portions of the text output based on the respective set of usability properties for each text portion of the text output;
  wherein the source content includes online meeting content shared by a set of participants of an online meeting;
  wherein performing the content recognition operation to electronically generate text output from the source content includes generating, as the text output, multiple text portions from the online meeting content shared by the set of participants of the online meeting;
  wherein the online meeting content includes a series of screenshots viewed by the set of participants of the online meeting;
  wherein the summarization output includes multiple selected text portions of the text output, each selected text portion corresponding to a different screenshot of the series of screenshots;
  wherein the method further comprises choosing a certain selected text portion from the multiple selected text portions of the text output and applying that certain selected text portion as a tag to the source content;
  wherein each screenshot of the series of screenshots has a respective order number indicating a location of that screenshot in the series of screenshots;
  wherein choosing the certain selected text portion from the multiple selected text portions includes picking the certain selected text portion from the multiple selected text portions based on the respective order number of each screenshot;
  wherein the series of screenshots includes a slideshow having slides, each slide having a different slide number corresponding to a location of that slide in the slideshow;
  wherein picking the certain selected text portion from the multiple selected text portions includes (i) selecting a particular slide number, and (ii) choosing, as the certain selected text portion, a portion of text from a particular slide having the particular slide number;
  wherein choosing the portion of text from the particular slide having the particular slide number includes:
    selecting the portion of text from the first slide of the slideshow in response to selecting slide #1 as the particular slide number; and
  wherein applying the certain selected text portion as the tag to the source content includes:
    labeling the source content with the selected portion of text from the first slide of the slideshow, the selected portion of text serving as a topic indicator during subsequent searching of different source content.

17. An electronic apparatus, comprising:
memory; and
control circuitry coupled to the memory, the memory storing instructions which, when carried out by the control circuitry, cause the control circuitry to:
  perform, on source content, a content recognition operation to electronically generate text output from the source content,
  electronically evaluate text portions of the text output based on predefined usability criteria to produce a respective set of usability properties for each text portion of the text output, and provide, as an electronic summary of the source content, summarization output which summarizes the source content, the summarization output including a particular text portion of the text output which is selected from the text portions of the text output based on the respective set of usability properties for each text portion of the text output;

wherein the source content includes online meeting content shared by a set of participants of an online meeting;

wherein the control circuitry, when performing the content recognition operation to electronically generate text output from the source content, generates, as the text output, multiple text portions from the online meeting content shared by the set of participants of the online meeting;

wherein the online meeting content includes a series of screenshots viewed by the set of participants of the online meeting;

wherein the summarization output includes multiple selected text portions of the text output, each selected text portion corresponding to a different screenshot of the series of screenshots;

wherein the control circuitry chooses a certain selected text portion from the multiple selected text portions of the text output and applies that certain selected text portion as a tag to the source content;

wherein each screenshot of the series of screenshots has a respective order number indicating a location of that screenshot in the series of screenshots;

wherein the control circuitry, when choosing the certain selected text portion from the multiple selected text portions, picks the certain selected text portion from the multiple selected text portions based on the respective order number of each screenshot;

wherein the series of screenshots includes a slideshow having slides, each slide having a different slide number corresponding to a location of that slide in the slideshow;

wherein the control circuitry, when picking the certain selected text portion from the multiple selected text portions, is constructed and arranged to (i) select a particular slide number and (ii) choose, as the certain selected text portion, a portion of text from a particular slide having the particular slide number;

wherein the control circuitry, when choosing the portion of text from the particular slide having the particular slide number, is constructed and arranged to:
select the portion of text from the first slide of the slideshow in response to selecting slide #1 as the particular slide number; and wherein the control circuitry, when applying the certain selected text portion as the tag to the source content, is constructed and arranged to:
label the source content with the selected portion of text from the first slide of the slideshow, the selected portion of text serving as a topic indicator during subsequent searching of different source content.

18. A computer program product as in claim 16 wherein the online meeting content includes a screenshot viewed by the set of participants of the online meeting; and wherein electronically evaluating the text portions of the text output includes:

identifying, as a usability property of each text portion of the text output, a relevance of that text portion based on whether that text portion resides in a relevance database.

19. An electronic apparatus as in claim 17 wherein the online meeting content includes a screenshot viewed by the set of participants of the online meeting; and wherein the control circuitry, when electronically evaluating the text portions of the text output, is constructed and arranged to:
identify, as a usability property of each text portion of the text output, a relevance of that text portion based on whether that text portion resides in a relevance database.

20. A method as in claim 1 wherein the multiple selected text portions of the text output include (i) a first set of selected text portions derived from the slideshow and (ii) a second set of selected text portions derived from a second set of screenshots that are not from the slideshow.

21. A method as in claim 1 wherein selecting the portion of text is further based on text location, text height, text size, and whether the text resides in a relevance database stored in a dedicated portion of memory, the relevance database having predefined terms.

22. A method as in claim 1 wherein selecting the portion of text from the first slide of the slideshow includes:
choosing text from a predefined region of slide #1 among multiple regions of slide #1.

23. A method as in claim 1, further comprising:
performing a search operation on different source content using the tag, the search operation providing a result that identifies the labeled source content among the different source content as being relevant.

24. A method of providing an electronic summary of source content, the method comprising:
performing, on the source content, a content recognition operation to electronically generate text output from the source content;

electronically evaluating text portions of the text output based on predefined usability criteria to produce a respective set of usability properties for each text portion of the text output; and providing, as the electronic summary of the source content, summarization output which summarizes the source content, the summarization output including a particular text portion of the text output which is selected from the text portions of the text output based on the respective set of usability properties for each text portion of the text output;

wherein the source content includes online meeting content shared by a set of participants of an online meeting;

wherein performing the content recognition operation to electronically generate text output from the source content includes generating, as the text output, multiple text portions from the online meeting content shared by the set of participants of the online meeting;

wherein the online meeting content includes a series of screenshots viewed by the set of participants of the online meeting;

wherein the summarization output includes multiple selected text portions of the text output, each selected text portion corresponding to a different screenshot of the series of screenshots;

wherein the method further comprises choosing a certain selected text portion from the multiple selected text portions of the text output and applying that certain selected text portion as a tag to the source content;

wherein each screenshot of the series of screenshots has a respective order number indicating a location of that screenshot in the series of screenshots;

wherein choosing the certain selected text portion from the multiple selected text portions includes picking the certain selected text portion from the multiple selected text portions based on the respective order number of each screenshot; and wherein applying the certain selected text portion as the tag to the source content includes:
   labeling the source content with the selected portion of text from the first screenshot in the series of screenshots, the selected portion of text serving as a topic indicator during subsequent searching of different source content.

\* \* \* \* \*